United States Patent Office 3,737,300
Patented June 5, 1973

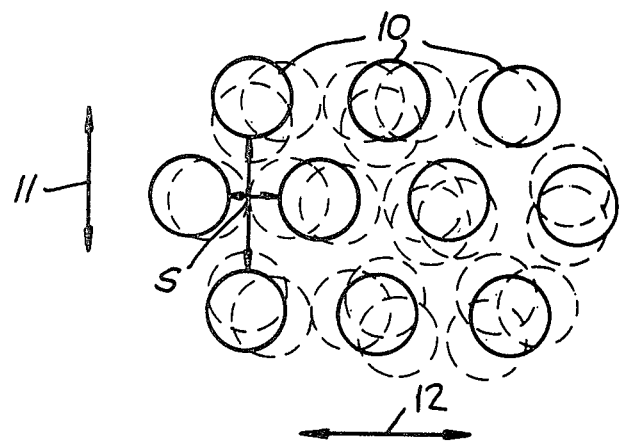

3,737,300
DISPERSION STRENGTHENED
TITANIUM ALLOYS
Robert Lacock Cairns and John Stanwood Benjamin,
 Suffern, N.Y., assignors to The International Nickel
 Company, Inc., New York, N.Y.
Filed July 6, 1971, Ser. No. 159,813
Int. Cl. B22f 9/00
U.S. Cl. 75—.5 BC                                    8 Claims

ABSTRACT OF THE DISCLOSURE

A wrought composite titaniferous and/or zirconiferous metal powder is provided comprised of a plurality of constituents, the composite powder being advantageously in the heavily cold worked condition and in which particles thereof are characterized metallographically by an internal structure comprised of the starting constituents intimately united together and mutually interdispersed. The process employed in producing the composite metal powder resides in providing a dry charge of attritive elements and a metallic titaniferous and/or zirconiferous powder mass containing at least one nonmetallic constituent inert to said metallic powder, subjecting the charge to high energy agitation milling under conditions inert to titanium and zirconium, preferably above room temperature, in which the charge is maintained kinetically in a highly activated state of relative motion, and continuing the milling under controlled inert conditions to produce wrought composite metal powder in which particles thereof are characterized metallographically by an internal structure in which the metallic and non-metallic constituents are substantially mutually interdispersed.

---

This invention relates to the production of wrought composite titaniferous and/or zirconiferous metal particles for use in the production of titanium and/or zirconium metal products, including alloys thereof, by powder metallurgy and, in particular, to a heavily cold worked composite metal powder in which the individual particles thereof have interdispersed uniformly therethrough a finely divided non-metallic constituent intimately united with the said titanium and/or zirconium.

RELATED APPLICATION

In U.S. Pat. No. 3,591,362 in the name of John S. Benjamin and assigned to the same assignee, a method is disclosed for producing a mechanically alloyed composite metal powder. In its broad aspects, the method comprises mixing a compressively deformable metallic powder with at least one other powdered material from the group consisting of a nonmetallic material and another metallic material and dry milling the mixture under conditions of repeated mutual impact compression sufficiently energetic to reduce substantially the thickness of at least the compressively deformable metallic constituents of the mixture and for a time sufficient to produce non-pyrophoric wrought composite particles which individually have substantially the composition of the mixture.

In a particular embodiment of that invention, a dry charge of attritive elements (e.g., nickel balls of plus ¼ minus ½ inch average diameter) and a powder mass of predetermined composition mixture is provided comprising a plurality of constituents, at least one of the constituents being a compressively deformable metal in an amount of at least 15% by volume, with the remainder of the powder mass being at least one other constituent from the group consisting of a non-metal and another metal, the metals having a melting point of at least 1000° K. The volume ratio of the attritive elements to the powder mass is at least about 4:1 and, more advantageously, at least about 10:1. The charge is then subjected to agitation milling under conditions in which a substantial portion of the attritive elements is maintained kinetically in a highly activated state of relative motion, whereby the attritive elements repeatedly contact the constituents through dynamic motion and cause them to unite and form composite metal particles, the milling being continued until cold worked composite metal particles are produced characterized by markedly increased hardness (that is, the particles contain a substantial amount of stored energy) and further characterized by an internal structure in which the constituents are intimately interdispersed. Thus, when the particles, which, in a preferred embodiment, are heavily cold worked to reach substantially the saturation hardness of the system involved, are subjected to a diffusion heat treatment, the intimately interdispersed constituents diffuse one into the other rather quickly to produce a homogenized matrix.

The foregoing method is particularly applicable to the production of wrought composite metal particles of a broad range of heat resistant alloy compositions comprising by weight up to about 65% chromium, up to about 8% aluminum, up to about 8% titanium, up to about 40% molybdenum, up to about 40% tungsten, up to about 20% columbium, up to about 40% tantalum, up to about 5% vanadium, up to about 15% manganese, up to about 2% carbon, up to about 3% silicon, up to about 1% boron, up to about 2% zirconium, up to about 6% hafnium, up to about 0.5% magnesium, up to about 10% by volume of a refractory compound, and the balance of the composition essentially at least about 25% by weight of at least one metal from the group consisting of iron, nickel and cobalt.

Alloys falling within the foregoing composition ranges and produced as described above, such as hot extruded dispersion strengthened age-hardenable chromium-containing nickel-base alloys, were observed to exhibit markedly improved high temperature strength properties.

PROBLEM CONFRONTING THE ART

Titanium is a reactive metal and in conventional metallurgy involving melting and casting, titanium is known to react substantially with all known refractories and common atmospheric gases such as oxygen and nitrogen. To assure the production of a ductile ingot, it is necessary to provide an inert atmosphere in the furnace as well as a crucible material that will not react with the molten metal. Even then, good ductile properties are not always assured.

A major impediment to the increased utilization of titanium lies in the generation of large quantities of contaminated and unclassified scrap which cannot be economically recycled within the titanium industry at the present time. Powder metallurgy has been proposed as one technique of fabricating titanium alloy shapes while reducing scrap volume. Powder metallurgy is particularly attractive since it is amenable to forming dispersion strenghtened alloys. However, finely divided titanium powder, because of its reactivity with environmental gases, e.g., oxygen, tends to be pyrophoric and becomes easily contaminated. The difficulty of producing refractory oxide dispersions in titanium by powder metallurgy, using alumina as the dispersant, is due to the high affinity of titanium for oxygen, and such refractory oxides as alumina do not exist easily in reactive titanium metal or alloy. In addition oxygen is highly soluble in titanium and, when present as a solute, has a decidedly embrittling effect on the metal.

In producing dispersion strengthened chromium-containing nickel-base alloys using the milling process of Pat. No. 3,591,362, oxygen contamination from the atmosphere does not appear to present a problem in that any oxygen that does enter the composition seems to confer a beneficial dispersion-strengthening effect on the resulting wrought alloy shape by reaction with such strong oxide formers as aluminum, titanium and similar alloying constituents. Apparently, this is not the case in working with titanium and titanium-base alloy powders. As stated hereinbefore, the tendency for titanium to absorb large amounts of oxygen results in embrittlement. Since the production of composite metal particles is based on the breaking down and welding together of the various ductile metal constituents, it became apparent that the conditions of milling as regards such metals as titanium and zirconium would have to be controlled to assure wrought composite powders having the necessary physical and chemical properties.

OBJECTS OF THE INVENTION

It is thus the object of this invention to provide a powder metallurgy mechanical alloying method for producing dispersion strenghtened composite titaniferous and/or zirconiferous metal powder.

Another object is to provide a powder metallurgy method for enhancing the mechanical properties of wrought titanium and/or zirconium alloys.

It is also the object of this invention to provide a wrought powder metallurgy shape of an alloy containing titanium and/or zirconium as one of the major ingredients.

A further object is to provide a dispersion strengthened alloy in which titanium and/or zirconium are the predominant ingredients.

These and other objects will more clearly appear when taken in conjunction with the following disclosure and the accompanying drawing, wherein:

The drawing depicts schematically a ball charge in a kinetic state of random collision.

STATEMENT OF THE INVENTION

Stating it broadly, the present invention resides in the production of wrought composite titaniferous and/or zirconiferous metal particles in which particles of at least one of the metals titanium and zirconium, or titanium-base and zirconium-base alloys, in the compressively deformable form are intimately united to form a mechanical alloy with at least one non-metallic material inert to titanium and zirconium.

By the expression "composite titaniferous and/or zirconiferous metal particles" in mean composite metal particles in which the elements titanium, zirconium and titanium plus zirconium constitute a major part of the composite metal composition, for example, at least about 60% by weight of the particles.

By the term "mechanical alloy" is meant that state which prevails in a composite metal particle containing titanium and/or zirconium in which at least one other non-metallic constitutent is caused to be bonded or united together with at least one of the aforementioned metals by the application of mechanical energy in the form of a plurality of repeatedly applied compressive forces sufficiently to vigorously work and deform at least one of the metals titanium and zirconium under inert conditions and cause it to bond or weld to itself and with non-metals, whereby the constitutents are intimately united together and codisseminated throughout the internal structure of the resulting composite metal particles.

The process according to this invention comprises dry milling the metal powder mixture under conditions substantially non-reactive to titanium and zirconium, including controlling the admission of air or oxygen so that total oxygen plus nitrogen within the powder particles over that in the stable dispersoid does not exceed 0.60% by weight or even 0.3% by weight, so as to avoid embrittlement due to absorption of oxygen and/or nitrogen, and, more advantageously, under conditions in which the temperature of milling is controlled at a range above room temperature, e.g., from about 150 to 700° F.

Thus, in its more preferred aspects, the mechanically alloyed composite metal particles are produced by forming a mixture of a metallic titaniferous and/or zirconiferous powder constituent with a non-metallic constituent inert to the foregoing metals, and subjecting the mixture in vacuum to the repeated application of compressive forces, for example, by agitation milling (high energy milling) under dry conditions in the presence of attritive elements maintained kinetically in a highly activated state of relative motion, and continuing the dry milling for a time sufficient to cause the constituents to comminute and bond and weld together and codisseminate throughout the resulting metal matrix of the product powder. The titaniferous and/or zirconiferous composite mechanically alloyed powder produced in this manner is characterized metallographically by a cohesive internal structure in which the metallic and non-metallic constituents are intimately united to provide an interdispersion of comminuted fragments of the starting constituents. The particles are produced in the heavily cold worked condition and exhibit within substantially each composite particle a microstructure characterized in that the non-metallic particles are closely spaced from each other. Generally, the microstructure appears to have striations.

Since countless numbers of individual particles are involved in the millings, a bed of grinding media is preferably required containing a large number of individual grinding balls. As will be appreciated, since the particles to be contacted must be available at the collision site between the grinding balls or between the grinding balls and the wall of the mill or container, the process is statistical and time dependent. The desired results are achieved by maintaining the attritive elements, e.g., ball elements, in a continuous and highly kinetic state of relative motion, such as by maintaining substantially all of the attritive elements in a highly activated state out of static contact with each other.

The high energy milling provides a condition which will achieve in the foregoing powder a marked increase in hardness, generally saturation hardness, compared to the base hardness of the starting metallic constituent. The resulting composite metal particles should have an average particles size of at least about 10 microns to assure a pyrophorically stable powder.

As illustrative of one type of attritive condition, reference is made to the drawing which shows a batch of ball elements 10 in a highly activated state of random momentum by virtue of mechanical energy applied multi-directionally as shown by arrows 11 and 12, the transitory state of the balls being shown in dotted circles. Such a condition can be simulated in a vibratory mill or attritor. Another mill is a high speed shaker mill oscillated at rates of up to 1200 cycles or more per minute wherein attritive elements are accelerated to velocities of up to about 300 centimeters per second (cm./sec.).

The dry milling process of the invention is statistical and time dependent as well as energy input-dependent, and milling is advantageously conducted under inert conditions for a time sufficient to secure a substantially steady state between the particle growth and particle comminution factors. It is to be appreciated that the energy input level under substantially inert conditions should advantageously exceed that required to achieve particle growth, for example, particle growth by a factor of 5, 10 or 25.

High energy mills are capable of providing energy input within a time period and at a level required in accordance with the invention. In mills containing grinding media, it is preferred to employ grinding elements capable of use at room and elevated temperatures such as certain heat resistant steels, stainless steel, tungsten carbide, etc. of relatively small diameter and of essentially the same size. The volume of the powders being milled should be substantially less than the dynamic interstitial volume between the attritive elements, e.g., the balls, when the attritive elements are in an activated state of relative motion. Thus, referring to the drawing, the dynamic interstitial volume is defined as the sum of the average volumetric spaces "S" between the balls while they are in motion, the space between the attritive elements or balls being sufficient to allow substantially all of the attritive elements to reach sufficient momentum before colliding. In carrying out the invention, the volume ratio of attritive elements to the powder should advantageously be over about 4:1 and, more advantageously, at least about 10:1, so long as the volume of powder does not exceed about one-quarter of the dynamic interstitial volume between the attritive elements. It is preferred in practice to employ a volume ratio of about 12:1 to 50:1.

The deformable metals, e.g., titanium, zirconium and alloys thereof, in the mixture are thus subjected to a continual kneading action by virtue of impact compression imparted by the grinding elements, particularly at above room temperature under inert conditions, during which individual metal components together with the non-metallic constituent making up the starting powder mixture become comminuted and fragments thereof are intimately united together and become mutually interdispersed to form composite metal particles having substantially the average composition of the starting mixture. As the particles begin to work harden, they become more susceptible to attrition so that there is a concomitant building up and breaking down of the particles and a consequent improvement of dispersion. The comminuted fragments kneaded into the resulting host metal particle will generally have a dimension substantially less than that of the original metal powders. Refractory hard particles inert to titanium and zirconium can be easily dispersed in the resulting particle at interparticle spacings of less than one micron, despite the fact that the starting metal powder might have been larger in size, e.g., 5, 10 or more microns.

The product powders produced in accordance with the invention have the advantage of being non-pyrophoric, i.e., of not being subject to spontaneous combustion when exposed to air. Indeed, the product powders are sufficiently large to resist substantial surface contamination when exposed to air. Thus, in general, a major portion of the product particles will exceed 10 microns in size and generally at least 75% or 80% of the particles should exceed 40 microns in average particle diameter. The particles may range in shape from substantially equiaxed to thick flaky particles having an irregular outline and an average low surface area per unit weight, i.e., a surface area not greater than about 6000 square centimeters per cubic centimeter of powder. Because the constituents are intimately and densely united together, there is very little, if any, internal porosity within the individual product particles. The relatively large particle size and low surface area which characterize the composite particles is an outstanding advantage in powder metallurgy processes requiring vacuum degassing for removing adsorbed or absorbed gases. The significance of this advantage becomes particularly marked when it is considered that certain fine metal particles (e.g. titanium) absorb as much as 10 times the volume of gas present in the interstitial spaces between the powder particles. The integrity of the mechanically alloyed product particles is such that the hardness thereof can usually be determined on the particles through the use of a standard diamond indenter employed in usual microhardness testing techniques. In contrast thereto, powder particles loosely sintered or agglomerated together by conventional techniques will usually collapse or fragment under the influence of a diamond indenter. The composite product powder produced in accordance with the invention, on the other hand, is characterized by a dense, cohesive internal structure in which the starting constituents are intimately united together.

To promote the build-up of the composite titaniferous and/or zirconiferous particles to a desirable size range and to assure a non-pyrophoric composite metal powder, the atmospheric conditions in the mill are controlled to assure inertness relative to the presence of titanium and/or zirconium present. As will be appreciated, during the milling, relatively high surface temperatures may be reached during the moment of impact of an attritive element on one or more particles which increases the rate of reaction with any oxygen or nitrogen present. This can be greatly minimized by milling in a vacuum in which the partial pressure of oxygen and/or nitrogen is maintained below 100 microns of mercury and the leak rate is low enough to keep oxygen and nitrogen contamination within the limits specified hereinabove.

The titanium and/or zirconium metal systems may range from the well known binary alloys to the more complex alloys, so long as at least one of the elements titanium and/or zirconium or both are present as a major ingredient of the mechanical alloy, e.g., at least about 60% by weight of the composite metal particles. Examples of alloys that can be produced by the invention are given as follows:

TABLE.—PERCENTAGES

| Ti | Al | V | Zr | Mo | Cr | Fe | Others |
|---|---|---|---|---|---|---|---|
| Balance | 6 | 4 | | | | | |
| Do | 6 | 1 | 4 | | | | |
| Do | 8 | 1 | | 1 | | | |
| Do | 7 | | 12 | | | | |
| Do | 3 | | | | 5 | | |
| Do | 4 | | | | | | (¹) |
| Do | 4 | 1 | | 3 | | | |
| Do | 4 | 4 | | 4 | | | |
| Do | 5 | | | | 2.75 | 1.25 | |
| Do | 5 | | | 1.2 | 1.4 | 1.5 | |
| Do | 7 | 4 | | | | | |
| Do | 2.5 | 16 | | | | | |
| Do | 3 | 13 | | | 11 | | |
| Do | 6 | 4 | 40 | | | | |
| Do | 8 | 1 | 45 | | | | |

¹ 4 Mn.

Cold worked composite metal particles which may be produced in accordance with the invention comprise up to about 10% aluminum, up to about 10% vanadium, up to 30% molybdenum, up to 15% chromium, up to 10% iron, up to 5% manganese, up to 15% tin, up to 2% silicon, up to 10% cobalt and the balance essentially at least 60% of at least one element from the group consisting of titanium and zirconium.

Any one of the foregoing alloys may be dispersion strengthened with an inert substantially insoluble dispersing agent in amounts ranging from about 0.5 to 25 volume percent, and generally from about 0.5 to 10 volume percent. Examples of non-metallic dispersing agents are thoria, the rare earth metal oxides, e.g., cerium oxide, lanthanum oxide, yttrium oxides, and the rare earth oxide mixtures didymia oxide and rare earth oxide. Generally speaking, the non-metallic material is refractory in nature and has a melting point of at least about 1300° C.

DETAIL ASPECTS OF THE INVENTION

In order to give those skilled in the art a better understanding of the invention, the following illustrative examples are given.

EXAMPLE 1

A thoria dispersed titanium alloy product is produced by forming a charge of about 560 grams of −100 mesh titanium powder mixed with 40 grams of approximately 50 A. thoria. The mixture of the two constituents is dry milled for 40 hours in a high energy attritor mill containing a charge of tungsten carbide balls (e.g., ¼ inch balls) at a volume ratio of ball to charge of about 10 to 1. The amount of thoria (6.7 weight percent) in the mixture corresponds to about 3.5 v./o. (volume percent). During milling, a continuous flow of dry 99.9% argon having a dew point of below −40° F. is fed at a flow rate of <500 cm.³/min. to the mill. Upon completion of the milling, the powder is separated from the tungsten carbide balls. The wrought composite powder may be used for forming articles therefrom by powder metallurgy techniques.

EXAMPLE 2

A titanium alloy having particular commercial use is one containing about 6% aluminum, 4% vanadium and the balance essentially titanium. An alloy powder of this composition (—100 mesh) in an amount of 600 grams is mixed with about 5% by weight of $Y_2O_3$ of approximately 200 A. in size. This corresponds to a volume percent $Y_2O_3$ of about 4.4%. The mixture is subjected to high energy milling as in Example 1 and dry milled for about 30 hours except that it is carried out in vacuum at below 100 micron pressure with a leak rate of less than 300 microns/minute measured in the attritor tank. The temperature of the mixture being milled is allowed to increase to about 300° C. (about 510° F.) by virtue of the friction resulting from the high energy milling in order to take advantage of the increased ductility of titanium at the higher temperature and to improve the welding of the particles together in the build-up of the composite metal particle during the milling operation. The wrought particles produced are characterized by a uniform dispersion of $Y_2O_3$ of less than 1 micron in interparticle spacing.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

We claim:

1. The process of producing wrought composite titaniferous and/or zirconiferous particles having an interdispersed internal structure which comprises mixing a compressively deformable metal powder selected from the group consisting of titanium, zirconium, titanium-base and zirconium-base alloys with at least one non-metallic material inert to titanium and zirconium and dry milling the mixture under conditions substantially non-reactive to titanium and zirconium in which the oxygen and nitrogen picked up in excess of that in the desired dispersoid does not exceed 0.6% by weight of the alloy, said dry milling being conducted under kinetic conditions of repeated mutual impact compression sufficiently energetic to cause the particles to comminute and weld together for a time sufficient to produce non-pyrophoric particles individually having substantially the composition of said mixture.

2. The process according to claim 1 wherein said dry milling is performed in a sealed chamber and is continued for a time sufficient to produce wrought composite metal particles of substantially saturated hardness, and the leak rate to said chamber is such that pickup of oxygen and nitrogen in excess of that present as dispersoid does not exceed 0.3% by weight.

3. A dry milling process for producing heavily cold worked composite titaniferous and/or zirconiferous metal particles which comprises:

providing a dry charge of attritive elements and a powder mass comprising mixing a metal powder selected from the group consisting of titanium, zirconium, titanium-base and zirconium-base alloys with at least one non-metallic material inert to titanium and zirconium, the volume ratio of attritive elements to the powder mass being at least about 4:1, the volume of the powder mass being substantially less than the dynamic interstitial volume of the space between the attritive elements during milling, subjecting said charge to dry agitation milling above room temperature under conditions substantially non-reactive to titanium and zirconium in which the oxygen plus nitrogen picked up in excess of that in the desired dispersoid does not exceed 0.6% by weight of the alloy and under conditions in which substantially all of said attritive elements are maintained kinetically in a highly activated state of relative motion, and continuing said milling to produce heavily worked composite metal particles, said particles being characterized metallographically by an internal structure comprising said constituents intimately united and interdispersed.

4. The process of claim 3, wherein said non-metallic material is an inert substantially stable high melting point refractory compound, wherein the temperature of attrition is controlled over a range of about 150° F. to 700° F., and wherein the excess oxygen pickup in the metal particles does not exceed 0.3% by weight.

5. The process of claim 4, wherein the milling time is such that the average distance between phases in the composite particles ranges up to about 1 micron.

6. The process of claim 4, wherein the volume ratio of the attritive elements to the powder mass is at least about 10:1 and wherein the milling is continued to produce cold worked composite metal particles characterized by saturation hardness.

7. The process of claim 5, wherein the powder mass contains essentially 0.5% to 10% by volume of said refractory compound inert to titanium and zirconium.

8. The process of claim 7, wherein the refractory compound is thoria in an amount ranging from about 0.5% to 5% by volume.

References Cited
UNITED STATES PATENTS
3,591,362   7/1971   Benjamin _____ 75—0.5 BA WAYLAND W. STALLARD, Primary Examiner

UNITED STATES PATENT OFFICE
CERTIFICATE OF CORRECTION

Patent No. 3,737,300      Dated June 5, 1973

Inventor(s) ROBERT LACOCK CAIRNS and JOHN STANWOOD BENJAMIN

It is certified that error appears in the above-identified patent and that said Letters Patent are hereby corrected as shown below:

Col. 3, line 47, for "in mean" read --is meant--.

Line 70, for "tices" read --ticles--.

Col. 4, line 43, for "particles" read --particle--.

Signed and sealed this 27th day of November 1973.

(SEAL)
Attest:

EDWARD M. FLETCHER, JR.         RENE D. TEGTMEYER
Attesting Officer                  Acting Commissioner of Patents